(12) United States Patent
Wilkinson

(10) Patent No.: US 8,928,673 B2
(45) Date of Patent: Jan. 6, 2015

(54) METHODS AND SYSTEMS FOR 3D ANIMATION

(75) Inventor: James Wilkinson, Edgewater, NJ (US)

(73) Assignee: Blue Sky Studios, Inc., Greenwich, CT (US)

(*) Notice: Subject to any disclaimer, the term of this patent is extended or adjusted under 35 U.S.C. 154(b) by 583 days.

(21) Appl. No.: 13/174,679

(22) Filed: Jun. 30, 2011

(65) Prior Publication Data

US 2012/0001907 A1   Jan. 5, 2012

Related U.S. Application Data

(60) Provisional application No. 61/360,484, filed on Jun. 30, 2010.

(51) Int. Cl.
*G06T 13/00* (2011.01)
*H04N 13/02* (2006.01)
*G03B 35/00* (2006.01)
*G06T 13/20* (2011.01)
*G06T 15/20* (2011.01)

(52) U.S. Cl.
CPC .......... *G06T 13/20* (2013.01); *H04N 13/0275* (2013.01); *G06T 15/20* (2013.01)
USPC .............. 345/473; 348/48; 352/57

(58) Field of Classification Search
CPC .......... H04N 13/026; H04N 13/0452; H04N 13/0456; H04N 13/0055; H04N 2013/0074; G06T 13/00
See application file for complete search history.

(56) References Cited

U.S. PATENT DOCUMENTS

| | | | |
|---|---|---|---|
| 6,538,654 B1 | 3/2003 | Rose et al. | |
| 6,608,624 B1 | 8/2003 | Wang | |
| 2006/0092154 A1 | 5/2006 | Lee | |
| 2007/0035619 A1 | 2/2007 | Yoon | |
| 2009/0128577 A1* | 5/2009 | Gloudemans et al. | 345/582 |
| 2009/0160934 A1* | 6/2009 | Hendrickson et al. | 348/47 |
| 2009/0219283 A1* | 9/2009 | Hendrickson et al. | 345/420 |
| 2009/0262108 A1* | 10/2009 | Davidson et al. | 345/419 |
| 2010/0039429 A1 | 2/2010 | Han | |
| 2012/0176481 A1* | 7/2012 | Lukk et al. | 348/47 |
| 2013/0050437 A1* | 2/2013 | Robinson | 348/47 |

* cited by examiner

*Primary Examiner* — Carlos Perromat
*Assistant Examiner* — Nurun N Flora
(74) *Attorney, Agent, or Firm* — Cantor Colburn LLP

(57) ABSTRACT

A system includes a computer apparatus, a means for display, and a means for storage. The computer apparatus is configured to perform a method of 3D animation. The method includes setting a first inter-axial distance between logical representations of a first set of two cameras, the first inter-axial distance being configured to produce a desired 3D effect for a target audience, setting a second inter-axial distance between logical representations of a second set of two cameras, the second inter-axial distance being based on the first inter-axial distance, setting a multi-rig spacing between the first and second sets of two cameras, the multi-rig spacing begin a value determined to reduce depth distortion effects in the 3D animation, and creating a stereoscopic frame set representing the 3D animation using the logical representations of the first and second sets of two cameras.

22 Claims, 14 Drawing Sheets

METHODS AND SYSTEMS FOR 3D ANIMATION

CROSS REFERENCE TO RELATED APPLICATIONS

This application claims priority under 35 U.S.C. 119 to U.S. Provisional Application Ser. No. 61/360,484, entitled "METHODS AND SYSTEMS FOR 3-DIMENSIONAL ANIMATION" filed on Jun. 30, 2010, the entire contents of which are hereby incorporated by reference herein. Furthermore, This application is related to co-pending U.S. patent application Ser. No. 13/174,642, entitled "METHODS AND SYSTEMS FOR 3-DIMENSIONAL ANIMATION", filed on Jun. 30, 2011, the entire contents of which are hereby incorporated by reference herein.

TECHNICAL FIELD

The present invention is generally related to computer animation. More particularly, example embodiments of the present invention are directed to methods and systems for providing three-dimensional (3D) animation.

BACKGROUND OF THE INVENTION

Conventionally, motion picture production includes recording live-action footage and preparation of the footage for distribution. In contrast, conventional computer animation includes complex modeling of physical representations of objects/characters to be recorded, computer-interpretation of those models, and frame-by-frame rendering of movements of those models to mimic live-action recording of conventional movies. Thereafter, background features are added and post-processing may occur to render sharp detail.

To achieve 3D animation tasks are inherently more complex and there is a need in the art to provide methods and systems for 3D animation which reduce the complexity of animation while also increasing final quality.

SUMMARY

According to an example embodiment of the present invention, a system for 3-dimensional animation includes a computer apparatus, a means for display in communication with the computer apparatus, and a means for storage in communication with the computer apparatus. The means for storage is disposed to store data representing a 3D animation, the means for display is disposed to display a representation of the 3D animation, and the computer apparatus is configured to perform a method of 3D animation. The method includes setting a first inter-axial distance between logical representations of a first set of two cameras, the first inter-axial distance being configured to produce a desired 3D effect for a target audience, setting a second inter-axial distance between logical representations of a second set of two cameras, the second inter-axial distance being based on the first inter-axial distance, setting a multi-rig spacing between the first and second sets of two cameras, the multi-rig spacing begin a value determined to reduce depth distortion effects in the 3D animation, and creating a stereoscopic frame set representing the 3D animation using the logical representations of the first and second sets of two cameras.

According to an example embodiment of the present invention, a method for 3D animation includes setting a first inter-axial distance between logical representations of a first set of two cameras, the first inter-axial distance being configured to produce a desired 3D effect for a target audience, setting a second inter-axial distance between logical representations of a second set of two cameras, the second inter-axial distance being based on the first inter-axial distance, setting a multi-rig spacing between the first and second sets of two cameras, the multi-rig spacing begin a value determined to reduce depth distortion effects in the 3D animation, and creating a stereoscopic frame set representing the 3D animation using the logical representations of the first and second sets of two cameras.

According to yet another example embodiment of the present invention, a computer program product for 3D animation includes a tangible storage medium readable by a computer processor and storing instructions thereon that, when executed by the computer processor, direct the computer processor to perform a method. The method includes setting a first inter-axial distance between logical representations of a first set of two cameras, the first inter-axial distance being configured to produce a desired 3D effect for a target audience, setting a second inter-axial distance between logical representations of a second set of two cameras, the second inter-axial distance being based on the first inter-axial distance, setting a multi-rig spacing between the first and second sets of two cameras, the multi-rig spacing begin a value determined to reduce depth distortion effects in the 3D animation, and creating a stereoscopic frame set representing the 3D animation using the logical representations of the first and second sets of two cameras.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views. Furthermore, each drawing contained in this provisional application includes at least a brief description thereon and associated text labels further describing associated details. The figures.

DETAILED DESCRIPTION

Figure 1:
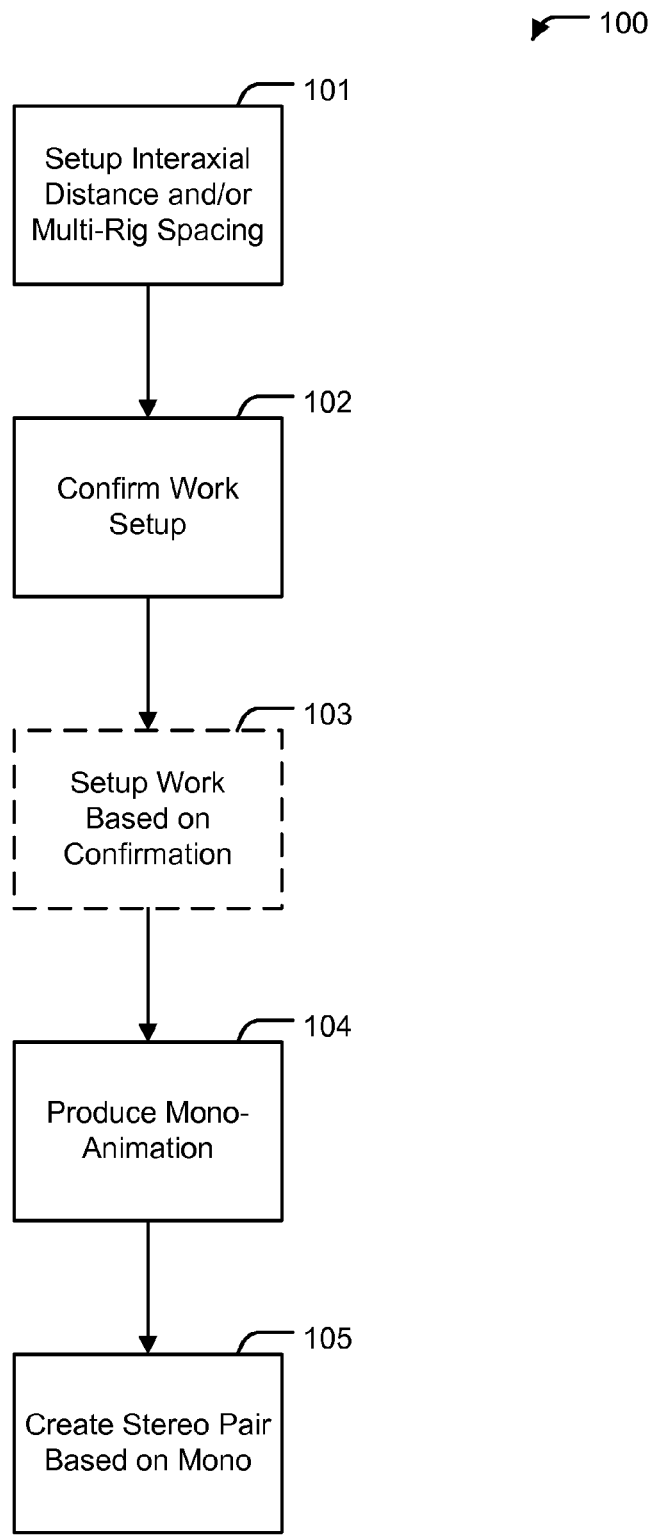
FIG. 1 depicts a method for 3D animation, according to example embodiments.

Further to the brief description provided above and associated textual detail of each of the figures, the following description provides additional details of example embodiments of the present invention.

Detailed illustrative embodiments are disclosed herein. However, specific functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments.

It will be understood that, although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting of example embodiments.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Hereinafter, example embodiments of the present invention will be described in detail.

Example embodiments of the present invention provide methods and systems for 3D animation which reduce the complexity of animation while also increasing final quality. According to example embodiments, methods and systems for 3D animation may be tailored for viewing by a particular audience. For example, an ocular distance for a wide range of viewing audiences may be taken into consideration during creation of the animation such that stereo pairs of frames are optimized for a target audience (e.g., children or adults). According to example embodiments, methods and systems for 3D animation may employ creation of a single camera view with a subsequent stereo paired view created based on the single camera view, thereby producing a stereo pair of frames for 3D viewing. Moreover, according to example embodiments, methods and systems for 3D animation may employ creation of a multi-rig camera view with a subsequent stereo paired views created based on the multi-rig camera view and subsequent compositing of all views to produce an optimized stereo pair of frames for 3D viewing Turning first to FIG. 1, according to an example embodiment of the present invention, a method 100 for 3D animation includes determining and/or setting up an inter-axial distance and/or multi-rig spacing at block 101. An ocular distance may be a measure corresponding to the separation between two eyes of a human. For example, a baseline ocular distance may be 2.0 for children of a target age group, while a baseline ocular distance may be 2.5 for average adults. The inter-axial distance is a measure of the virtual displacement between focal axes of a pair of virtual cameras arranged as a stereoscopic camera rig. The inter-axial distance may be based upon a target audience's ocular distance, or some derivation thereof. The multi-rig spacing is a measure of the virtual displacement between two or more virtual stereoscopic camera rigs. The multi-rig spacing may be based upon a depth or desired perceived depth of scenery to be rendered as a 3D animation for viewing by a target audience.

The method 100 may further include confirming a work set up at block 102. The work set up may be a set of computer settings, defaults, and/or selections which have been preselected for a desired animation project. The confirming may include determining if the inter-axial distance and/or multi-rig spacing is acceptable based on the computer settings, or if further adjustments may be necessary to produce a desired 3D effect.

The method 100 may further include setting up a work set up based on the confirmation at block 103. For example, if further adjustments are needed based on the confirming, additional selections, computer settings, or other changes may be made to produce a desired 3D effect.

The method 100 further includes producing a mono animation at block 104. For example, producing may include rendering a plurality of computer animation frames based on a desired or predetermined frame rate, the animation frames comprised of a desired number of pixels or being of a desired resolution. The producing may further include pre-processing, post-processing, editing, deleting, audio-integration, or any other suitable and/or necessary actions for producing a plurality of computer animation frames based on a single virtual camera view.

The method 100 further includes creating a stereo pair of frames based on the mono-animation. For example, creating may include using a computer model of the mono animation to render frames of a left or right perspective to the viewing angle of the mono animation's frames. For example, if the mono-animation includes a viewing angle of a right side (i.e., right eye), the creating includes creating accompanying left view (i.e., left eye) frames. If the mono-animation includes a viewing angle of a left side (i.e., left eye), the creating includes creating accompanying right view (i.e., right eye) frames. The left (or right) accompanying frames are produced taking into consideration the set up inter-axial distance for rendering of a precise viewing angle. In this manner, an accompanying frame for each of the plurality of frames for the mono animation is created, thereby producing a set of stereoscopic frames for producing a desired 3D effect when viewed.

The set of produced stereoscopic frames may be further edited, processed, altered, and/or otherwise manipulated according to any desired final effect(s) through a system for 3D animation.

Figure 2:
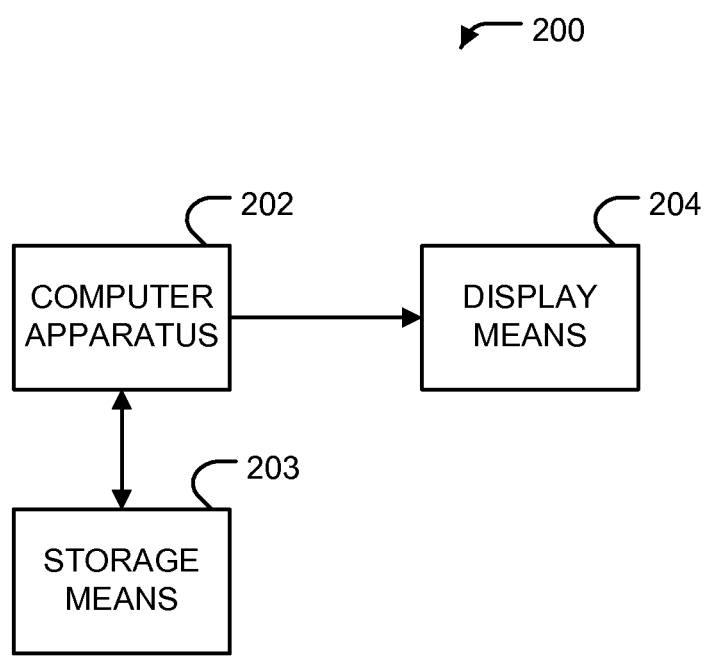
FIG. 2 depicts a system for 3D animation, according to example embodiments.

Hereinafter, a system for 3D animation is described with reference to FIG. 2.

The system 200 for 3D animation includes a computer apparatus 202. The computer apparatus may be any suitable computer apparatus including a server system, multi-processor system, personal computer, networked computing cluster, computing cloud, or any computer apparatus capable of practicing example embodiments.

The system 200 may further include a storage means 203 in communication with the computer apparatus 202. The storage means may be any suitable storage means disposed to store information related to 3D animation. The storage means may include a single storage element, or a plurality of storage elements. The storage means may be used in combination with any storage available on the computer apparatus 202, or may be omitted if suitable storage is available on the computer apparatus 202. The storage means 203 may include backup elements and/or recording elements. The recording elements may be disposed and configured to produce usable copies of any 3D animation produced at the computer apparatus. The usable copies are copies of a 3D animation which are viewable at a suitable apparatus. For example, a suitable apparatus may include a means for reading 3D animation data from a copy (DVD, double-reel film, recording media, etc). The suitable apparatus may also include means for displaying stereoscopic images/frames read from the 3D animation data. The displaying may include displaying left/right frames in parallel, successively, superimposed, or in any suitable fashion.

For example, if passive polarizing lenses are used for viewing the displayed frames, successive display of left/right frames polarized opposite to one-another may be suitable. Alternatively, the frames may be displayed side-by-side or otherwise separated and simultaneously. Other active techniques may be employed including "shuttered" glasses or lenses. Furthermore, additional passive techniques may be employed including red-cyan glasses or lenses. It is noted that exhaustive description of every possible combination of stereoscopic display is beyond the scope of this disclosure, and is omitted herein for the sake of brevity. The suitable apparatus may also include means for producing audio from the 3D animation data.

The system 200 may further include a display means 204 in communication with the computer apparatus 202. The display means 204 may be any suitable display, including a passive, active, or auto-stereoscopic 3D display (e.g., 3D-LCD, 3D-Plasma, 3D-computer monitor, lenticular screened display, parallax barrier screened display) or a conventional display (e.g., computer monitor, LCD, plasma, etc).

Hereinafter, detailed description of methodologies for creating 3D animation is provided.

Figure 3:
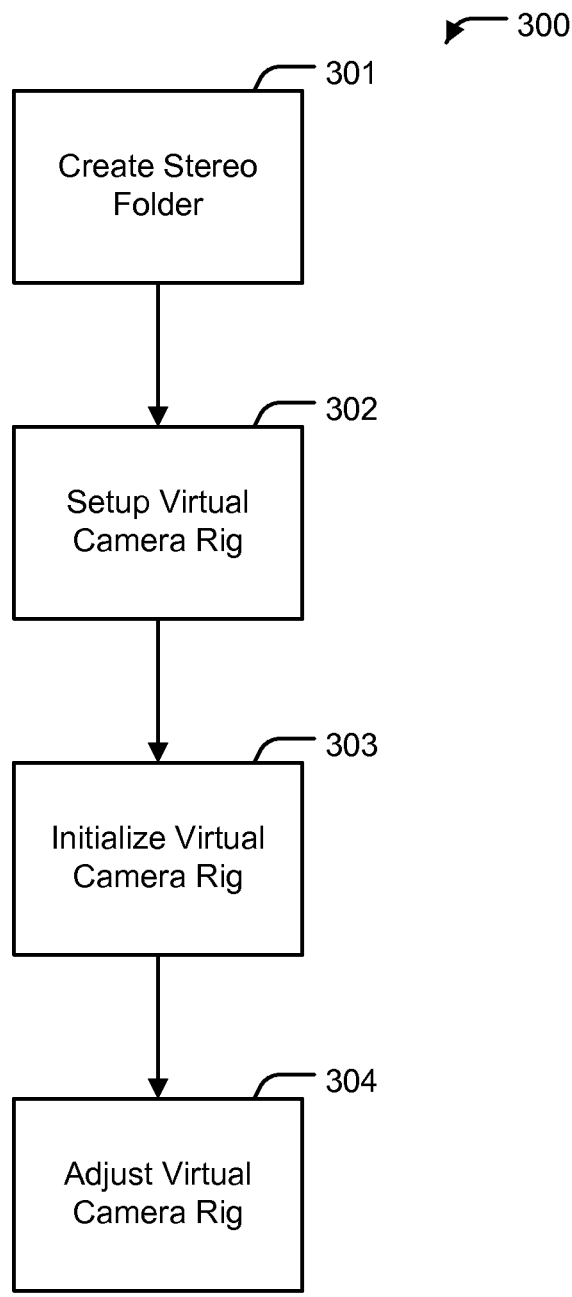
FIG. 3 depicts a method for 3D animation, according to example embodiments.

Turning to FIG. 3, a method for 3D animation is depicted. The method 300 includes creating a stereo storage folder at a computer apparatus at block 301. The stereo storage folder is configured to store information related to a stereoscopic pair of frames for a 3D animation sequence, and may include information related to inter-axial distance(s) for a stereoscopic pair of frames. Upon creation of the stereo storage folder, a work set up may be confirmed. For example, a rendering of a stereoscopic pair of frames may be viewed to confirm a desired 3D effect. The pair may be viewed side-by-side on a display means, over-and-under, or in any suitable fashion.

Thereafter, virtual stereoscopic camera rig is set up through computer software at a computer apparatus at block 303. The virtual stereoscopic camera rig is a first virtual camera in parallel with a main virtual camera, separated at an inter-axial distance based on a desired ocular distance of a target viewing audience. The inter-axial distance may be set up previously to produce a desired 3D effect for the target viewing audience. The virtual stereoscopic camera rig is a logical representation of a real stereoscopic camera within computer software of a computer system. Through intelligent rendering, frames for a simulated 3D object/movie scene are rendered from a perspective equivalent to a real stereoscopic camera in a substantially similar physical layout. Therefore, a main camera and a duplicate camera may produce a logical representation of a real stereo-camera pair. This logical representation may be used to render stereoscopic frames. Furthermore, as described above, a mono-set of frames may be first produced, with the second set produced after initial rendering of the animation of one portion of frames.

Thereafter, the virtual stereoscopic camera rig is initialized in the computer software of the computer apparatus at block 303. Initialization may include activating a software object or initializing computer executable code segments which direct the computer apparatus to produce/render frames from the virtual stereoscopic camera rig.

As mentioned above, a display means may be configured to display a stereoscopic pair of images/frames to confirm work settings. Upon initialization of both the main camera and the duplicate camera, it may be desirable to re-confirm work settings using a display.

Thereafter, fine-tuning or adjustments to the camera pair may be made at block 304. For example, settings for the virtual camera pair may be adjusted to create a desired 3D effect. The settings may include a focal length, depth-field, volume of depth, desired axial separation, distance to object to be captured/recorded, distance to background area to be captured/recorded, as well as any other suitable settings including adjustment of inter-axial distance again.

As described above, a virtual stereoscopic camera rig may include logical representations of at least two cameras. Hereinafter, virtual stereoscopic camera rigs are described in detail with reference to FIGS. 4 and 5.

Figure 4:
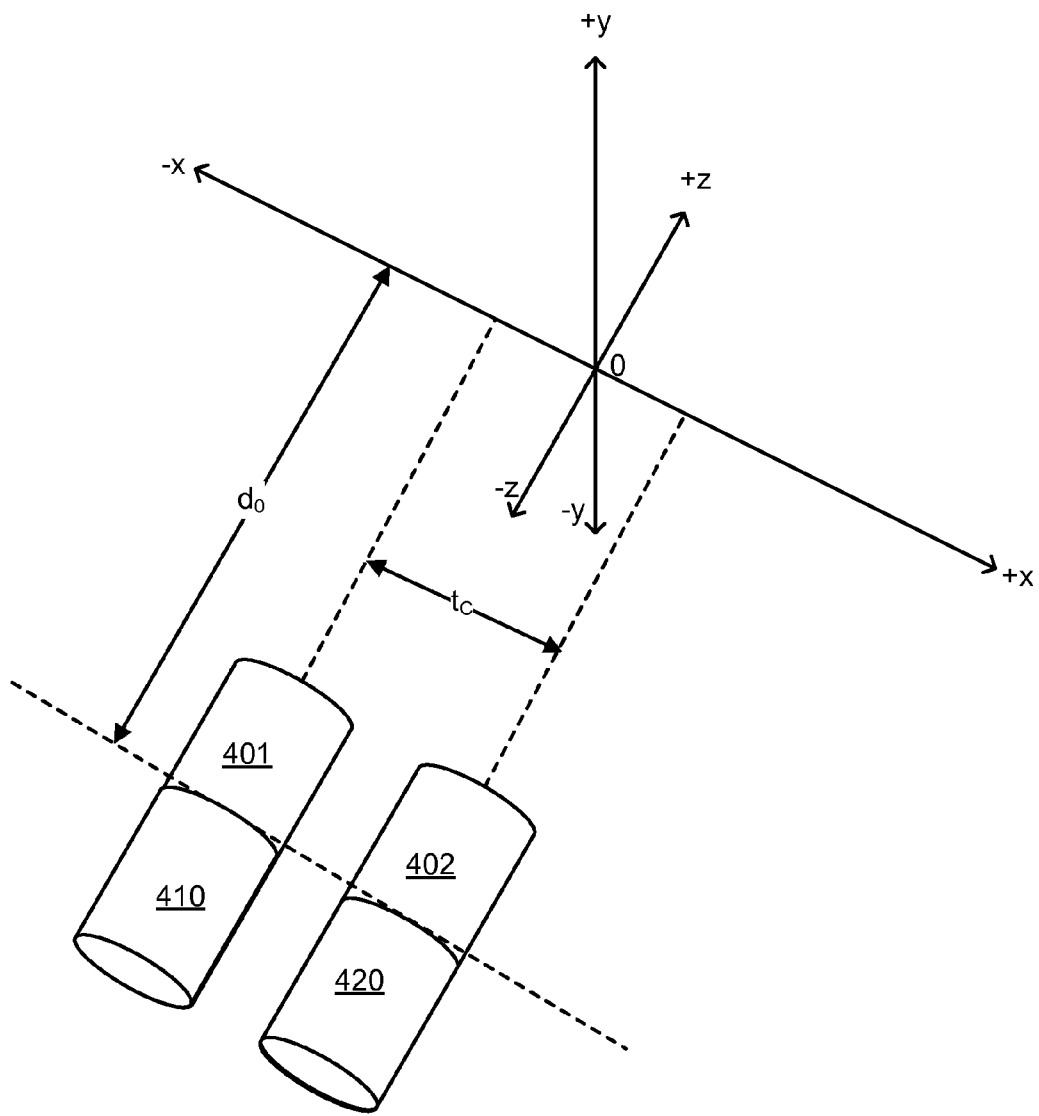
FIG. 4 depicts a virtual stereoscopic camera rig for 3D animation, according to example embodiments.

Turning to FIG. 4, a virtual stereoscopic camera rig is illustrated. The virtual stereoscopic camera rig may comprise a first virtual lens 401 and a second virtual lens 402 separated by an inter-axial spacing of $t_C$. The virtual stereoscopic camera rig may further include a first virtual film plate 410 arranged proximate the first virtual lens 401. The first virtual film plate 410 is a logical representation of a real film plate or optical sensor for capturing video. The virtual stereoscopic camera rig may further include a second virtual film plate 420 arranged proximate the second virtual lens 402. The second virtual film plate 420 may be substantially similar to the first virtual film plate 410, or may be configured to perform differently according to any desired final 3D effect.

A recording plane of the virtual film plates is perpendicular to both virtual lens axes depicted. Furthermore, both virtual lens axes are parallel. It is apparent then that any images rendered from a distance $d_0$ may produce a form of parallax. However, this parallax may be reduced and/or minimized through use of horizontal image translation. Such is illustrated in FIG. 5.

Figure 5:
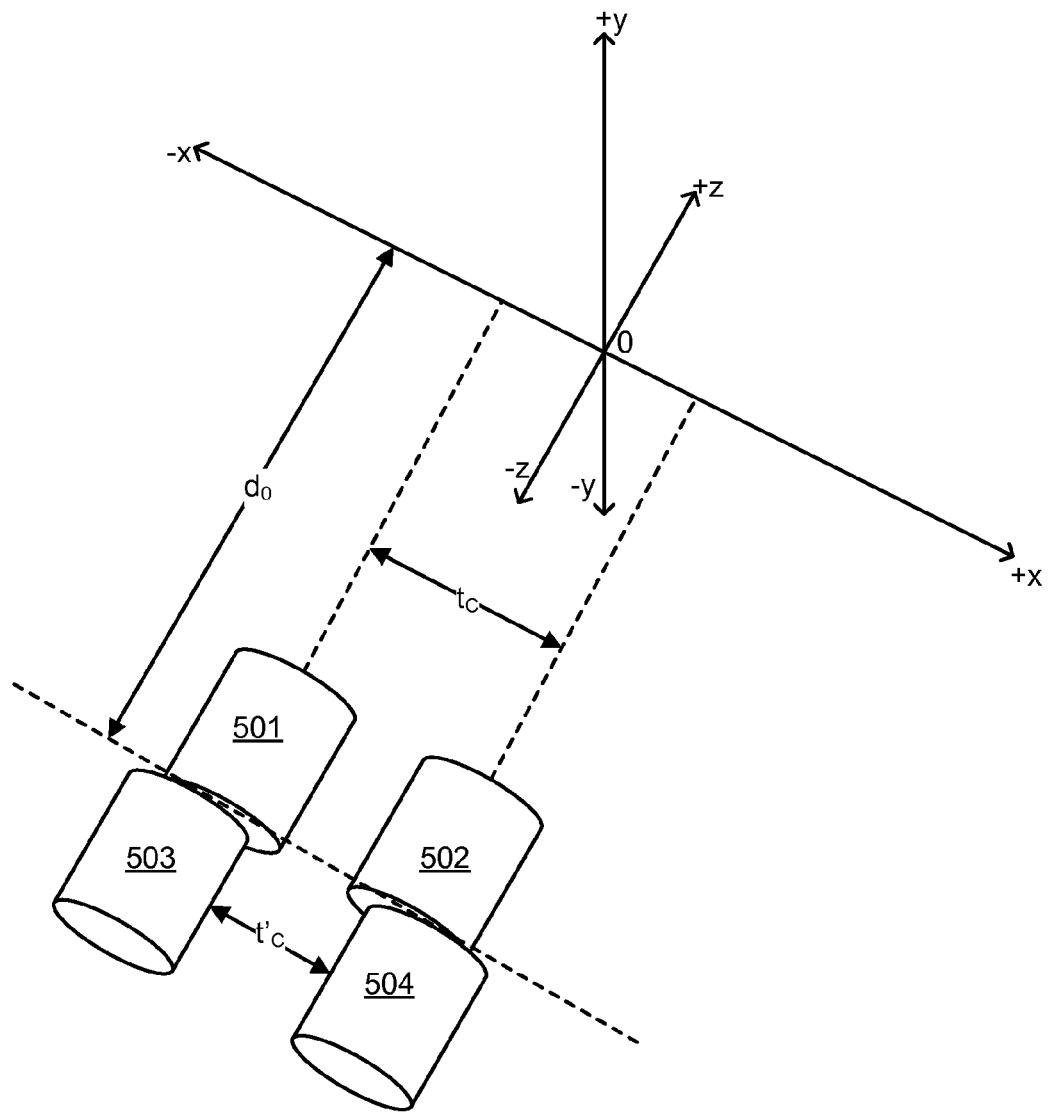
FIG. 5 depicts a virtual stereoscopic camera rig for 3D animation, according to example embodiments.

Turning to FIG. 5, an enhanced virtual stereoscopic camera rig is illustrated. The virtual stereoscopic camera rig may comprise a first virtual lens 501 and a second virtual lens 502 separated by an inter-axial spacing of $t_C$. The virtual stereoscopic camera rig may further include a first virtual film plate 510 arranged proximate the first virtual lens 501. The first virtual film plate 510 is a logical representation of a real film plate or optical sensor for capturing video. The virtual stereoscopic camera rig may further include a second virtual film plate 520 arranged proximate the second virtual lens 502. The second virtual film plate 520 may be substantially similar to the first virtual film plate 510, or may be configured to perform differently according to any desired final 3D effect.

A recording plane of the virtual film plates is perpendicular to both virtual lens axes depicted. Furthermore, both virtual lens axes are parallel. However, both virtual film plates are adjustable along the x-axis denoted by the measure $t'_C$. The adjustment may be performed through computer software such that horizontal displacement of the virtual film plates encourages horizontal image translation. Through the use of horizontal image translation, any otherwise resulting keystoning effects and parallax may be reduced by establishing a zero parallax setting.

By shifting the projection images through the use of the adjustable spacing of the virtual film plates, an observer has the ability to control the relative "out-of-screen" or "into-screen" parallax of objects in the scene. Typically the overall parallax effect is determined by a combination of the pre-rendering viewpoint separation step and post-rendering image shift step.

Overall parallax control may be achieved through a combination of both inter-axial distance manipulation and horizontal image shift adjustment. Increasing inter-axial distance widens the parallax between left and right views for greater overall depth effect. Compensating horizontal image shift values determine where the zero-parallax setting is located in a scene, and therefore serve to balance the out-of-screen and into-screen depth effects.

According to example embodiments, a user may adjust both inter-axial distance and horizontal image shift throughout the image synthesis process. The user would also be allowed to fine-tune both of these parallax parameters for optimal stereoscopic depth effects.

Using the horizontal shift adjustments described above, an enhanced 3D stereographic rendering may be produced by the virtual camera rigs adjusted at block 304 of method 300.

Thereafter, a minor sequence or short sequence of 3D animation may be rendered to re-confirm a desired 3D effect. For example, a short sequence including character motion, background motion, camera-panning, and/or other manipulation of portions of a virtual movie set and cameras may be produced. Thereafter, the short sequence may be viewed and/or confirmed.

Figure 6:
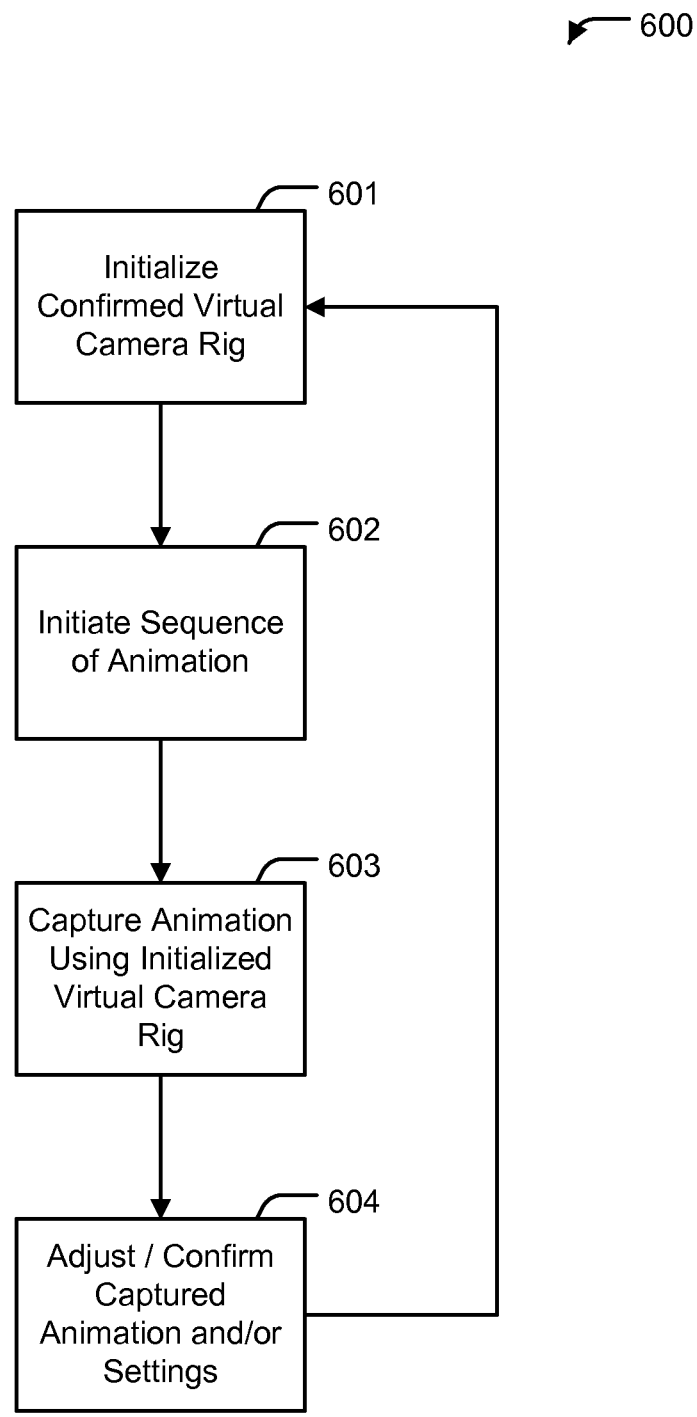
FIG. 6 depicts a method for 3D animation, according to example embodiments.

For example, as illustrated in FIG. 6, a method for producing 3D animation includes initializing a confirmed or previously adjusted virtual camera rig at block 601. Thereafter, a sequence of animation may be initiated at block 602 and captured using the initialized virtual camera rig at block 603. The initiating and capturing may include rendering a plurality of computer animation frames based on a desired or predetermined frame rate, the animation frames comprised of a desired number of pixels or being of a desired resolution. The initiating and capturing may further include recording, through the virtual camera rig, the animation in a similar fashion as to real-life recording. Further, pre-processing, post-processing, editing, deleting, audio-integration, or any other suitable and/or necessary actions for producing a plurality of computer animation frames may be performed at block 604.

Upon adjusting/confirming the captured animation, the method 600 may repeat as necessary to re-adjust settings and re-capture a desired 3D animation.

Thereafter, animation curves may be produced, and a final sequence or portion of a 3D animation may be produced. The animation curves may be set up through confirmation of a plurality of scene settings. The scene settings being logical representations of a physical set including elements rendered by the computer apparatus. For example, there may be a scene layout, scene background, characters, and animation of each, including any other suitable elements. Each of these settings may be checked/confirmed through short sequences as described above, or through real-time manipulation of the virtual stereo-camera pair described above. For example, the computer software may be configured to allow a user to control the panning/motion of the stereo-camera pair in relation to the scene, while at substantially the same time allowing for adjustment of any desired settings. Upon confirmation, the final sequence or portion of the animation may be rendered, approved, and stored/edited.

This final sequence/animation may be stored in the stereo storage folder described above, or in another storage portion such that final approval, interim approval, or disapproval may be decided. If approved, the sequence may be stored for later editing and/or inclusion in a complete 3D animation. If interim/temporary approval is decided, the sequence may be stored and/or edited while other portions/sequences of a complete 3D animation are produced. If not approved, the entire sequence may be reproduced using different settings (described above).

Although termed "final" sequence or animation, it should be understood that the sequence may be further adjusted or edited using computer software/modeling to achieve a desired 3D effect.

Figure 7:
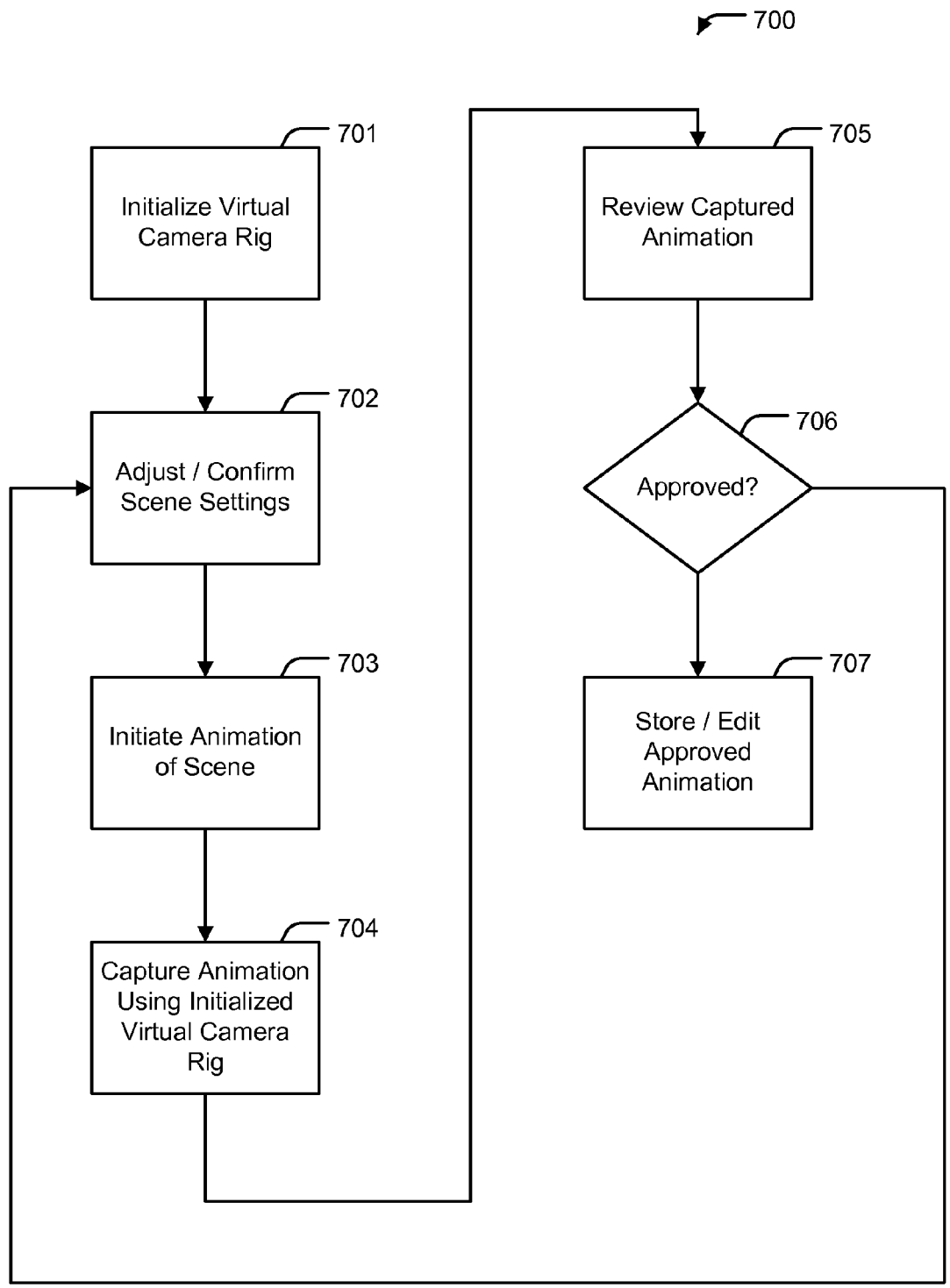
FIG. 7 depicts a method for 3D animation, according to example embodiments.

For example, FIG. 7 depicts a method for 3D animation including initializing a virtual camera rig at block 701. Thereafter, scene settings for a desired scene of a 3D animation may be adjusted/confirmed at block 702. Animation may be initiated at block 703 and captured using the initialized virtual camera rig at block 704. Upon capturing, the captured animation may be reviewed at block 705 and submitted to an approval process at block 706. The approval process may include viewing of the captured 3D animation by a director or sterographic director of the 3D animation and approval, interim-approval, or final approval given as described above. The approved 3D animation may then be stored for further editing or distribution at block 707. Furthermore, using information garnered through the approval process, additional settings may be adjusted and the method 700 may repeat at block 701 or 702.

It should be understood that although techniques for producing 3D animation have been described above which are somewhat similar to video capture through real stereoscopic cameras, the adjustments described for the exemplary virtual camera rigs provide for easier capture of 3D animation as compared to conventional rendering techniques. The adjustments for achieving a zero parallax setting are easily extensible across the 3D animation filmmaking process and a plurality of pre-configured virtual camera rigs may be created and stored as described above. It should also be appreciated that the reduction of parallax and easy adjustment of virtual camera rigs also allow for repetitious capture of different viewpoints of the same scenes in an animation, thereby allowing for adjustments otherwise not available in a real world scenario. Additionally, as should be understood in the art of stereoscopic video rendering, the depth of field and focal points for a plurality of background objects may introduce distortions in a final stereographic scene which hinder an audience's ability to enjoy a "real looking" or immersive viewing experience. However, example embodiments further provide methods for 3D animation which reduce these distortions through use of an exemplary virtual camera multi-rig.

Hereinafter, detailed description of methodologies for creating 3D animation with virtual camera multi-rigs is provided.

Figure 8:
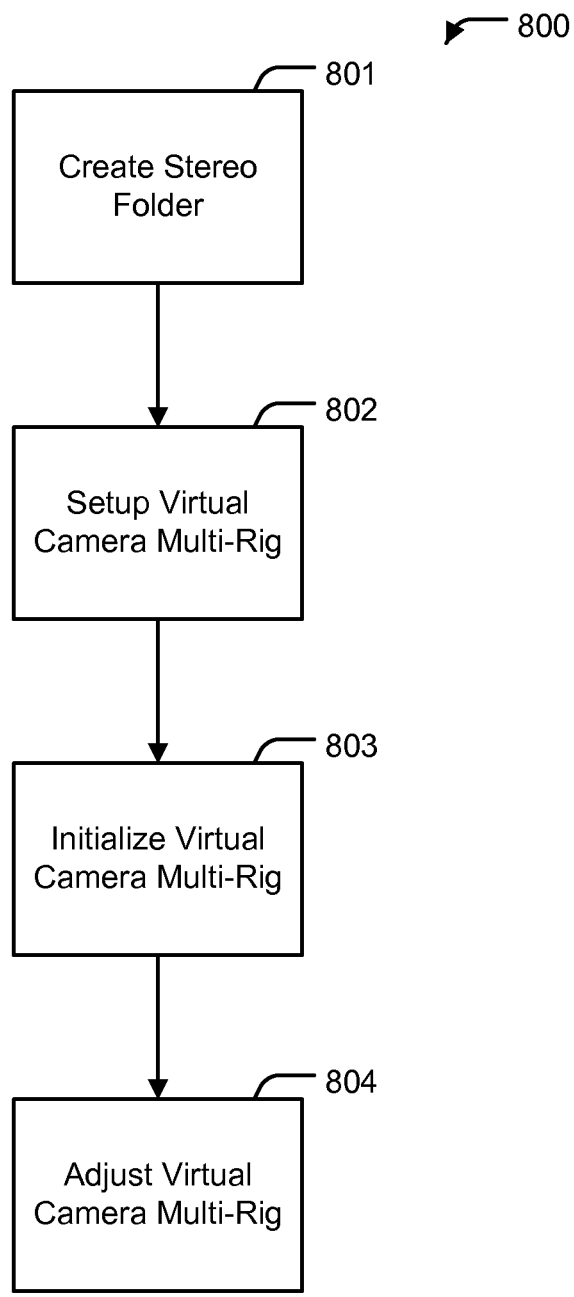
FIG. 8 depicts a method for 3D animation, according to example embodiments.

Turning to FIG. 8, a method for 3D animation is depicted. The method 800 includes creating a stereo storage folder at a computer apparatus at block 801. The stereo storage folder is configured to store information related to a plurality of related stereoscopic pairs of frames for a 3D animation sequence, and may include information related to inter-axial distance(s) and camera multi-rig separation for a plurality of related stereoscopic pairs of frames. The plurality of related stereoscopic pairs of frames are a set of at least two related pairs of stereoscopic frames of a scene for a 3D animation taken at different viewpoints, for example, by multiple virtual stereoscopic cameras arranged in differing virtual spatial relationships.

Upon creation of the stereo storage folder, a work set up may be confirmed. For example, a rendering of a plurality of related stereoscopic pairs of frames may be viewed to confirm a desired 3D effect. The pairs may be viewed side-by-side on a display means, over-and-under, or in any suitable fashion.

Thereafter, virtual stereoscopic camera multi-rig is set up through computer software at a computer apparatus at block 303. The virtual stereoscopic camera multi-rig comprises, at least, a first virtual camera in parallel with a second virtual camera, separated at an inter-axial distance based on a desired ocular distance of a target viewing audience; and a third virtual camera in parallel with a fourth virtual camera, separated at an inter-axial distance based on a desired ocular distance of a target viewing audience; wherein the first and second virtual cameras are separated from the third and fourth virtual cameras by the multi-rig spacing. The inter-axial distance may be set up previously to produce a desired 3D effect for the target viewing audience and may be the same or different for both pairs of stereoscopic camera. The virtual stereoscopic camera rigs are logical representations of real stereoscopic cameras within computer software of a computer system. Through intelligent rendering, frames for a simulated 3D object/movie scene are rendered from a perspective equivalent to sets of real stereoscopic cameras in a substantially similar physical layout. Therefore, the virtual camera multi-rig may produce a logical representation of a real multiple stereo-camera pair. This logical representation may be used to render a plurality of related stereoscopic frames. Furthermore, as described above, a mono-set of frames may be first produced for each camera pair, with the second set produced after initial rendering of the animation of one portion of frames.

Thereafter, the virtual stereoscopic camera multi-rig is initialized in the computer software of the computer apparatus at block 303. Initialization may include activating a software object or initializing computer executable code segments which direct the computer apparatus to produce/render frames from the virtual stereoscopic camera multi-rig.

As mentioned above, a display means may be configured to display stereoscopic pairs of images/frames to confirm work settings. Upon initialization of the first, second, third and fourth virtual cameras, it may be desirable to re-confirm work settings using a display.

Thereafter, fine-tuning or adjustments to the camera pairs may be made at block 304. For example, settings for each virtual camera pair may be adjusted to create a desired 3D effect. The settings may include a focal length, depth-field, volume of depth, desired axial separation, distance to object to be captured/recorded, distance to background area to be captured/recorded, as well as any other suitable settings including adjustment of inter-axial distance again alongside the multi-rig spacing.

As described above, a virtual stereoscopic camera multi-rig may include logical representations of at least four cameras. Hereinafter, virtual stereoscopic camera multi-rigs are described in detail with reference to FIG. 9.

Figure 9:
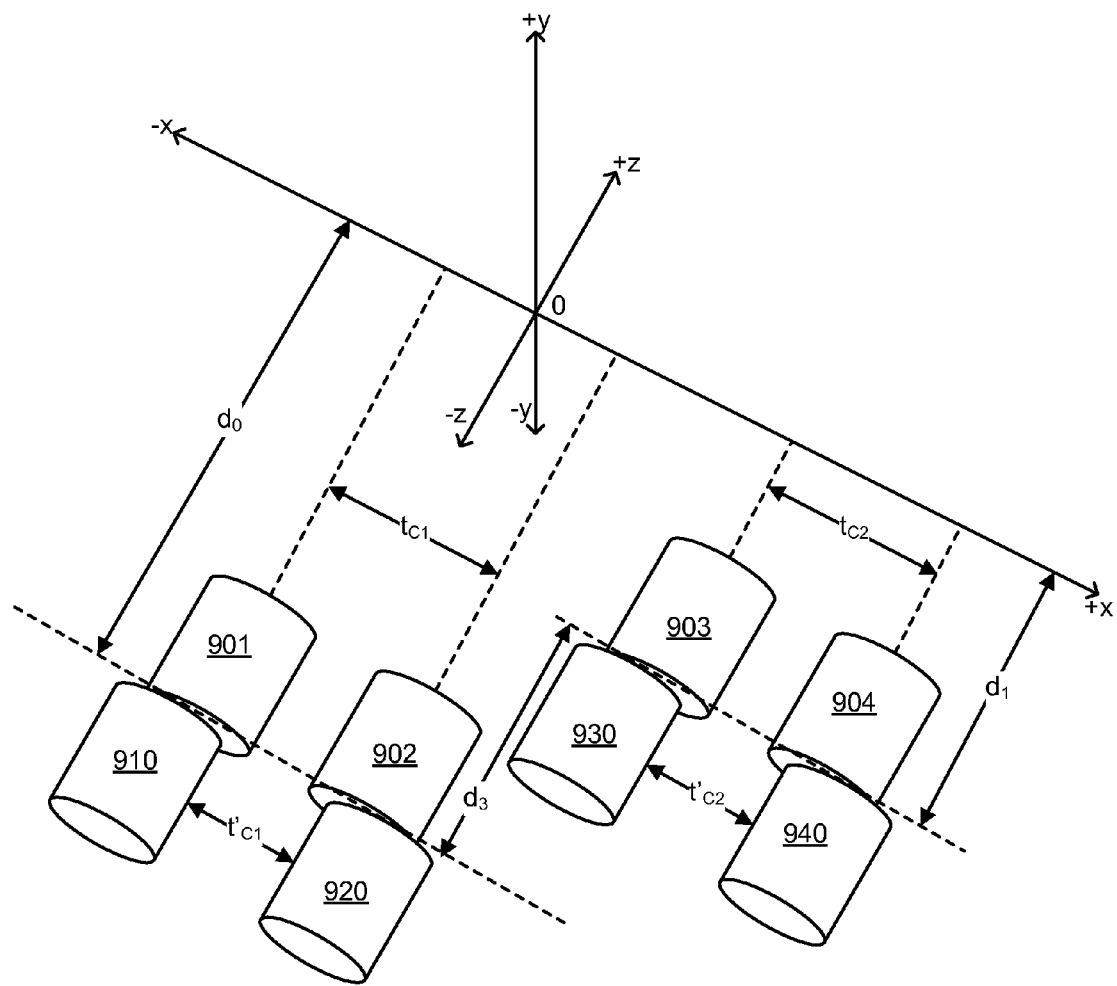
FIG. 9 depicts a virtual stereoscopic camera multi-rig for 3D animation, according to example embodiments.

Turning to FIG. 9, an enhanced virtual stereoscopic camera multi-rig is illustrated. The virtual stereoscopic camera multi-rig may comprise a first virtual lens 901 and a second virtual lens 902 separated by an inter-axial spacing of $t_C$. The virtual stereoscopic camera multi-rig may further include a first virtual film plate 910 arranged proximate the first virtual lens 901. The first virtual film plate 910 is a logical representation of a real film plate or optical sensor for capturing video. The virtual stereoscopic camera multi-rig may further include a second virtual film plate 920 arranged proximate the second virtual lens 902. The second virtual film plate 920 may be substantially similar to the first virtual film plate 910, or may be configured to perform differently according to any desired final 3D effect.

The virtual stereoscopic camera multi-rig may further comprise a third virtual lens 903 and a fourth virtual lens 904 separated by an inter-axial spacing of $t_{C2}$. The virtual stereoscopic camera multi-rig may further include a third virtual film plate 930 arranged proximate the third virtual lens 903. The third virtual film plate 930 is a logical representation of a real film plate or optical sensor for capturing video. The virtual stereoscopic camera multi-rig may further include a fourth virtual film plate 940 arranged proximate the fourth virtual lens 904. The fourth virtual film plate 940 may be substantially similar to the first, second, and third virtual film plates 910, 920, and 930, or may be configured to perform differently according to any desired final 3D effect.

A recording plane of each pair of the virtual film plates is perpendicular to both virtual lens axes depicted. Furthermore, both virtual lens axes of each camera pair are parallel. The recording planes of the pairs of virtual cameras are separated by a multi-rig distance $d_3$. Although particularly illustrated in a particular orientation, it should be appreciated that the pairs of virtual cameras may be overlapping, angled, shifted, or otherwise set up differently than the example shown. More clearly, as the pairs of cameras are virtual, there is no physical limitation as to their placement for recording.

Furthermore, both pairs of virtual film plates are adjustable along the x-axis denoted by the measure $t'_C$ and $t'_{C2}$. The adjustment may be performed through computer software such that horizontal displacement of each of the virtual film plates encourages horizontal image translation. Through the use of horizontal image translation at each pair of virtual cameras, any otherwise resulting keystoning effects and parallax may be reduced by establishing a zero parallax setting.

By shifting the projection images through the use of the adjustable spacing of the virtual film plates, an observer has the ability to control the relative "out-of-screen" or "into-screen" parallax of objects in the scene. Typically the overall parallax effect is determined by a combination of the pre-rendering viewpoint separation step and post-rendering image shift step. Furthermore, through adjustment of the multi-rig spacing, distortions due to depth of field differences between foreground and background of a 3D animation may be reduced.

Therefore, overall parallax and distortion control may be achieved through a combination of inter-axial distance manipulation, horizontal image shift adjustment, and multi-rig spacing for the entire multi-rig camera. Increasing inter-axial distance widens the parallax between left and right views for greater overall depth effect. Movement or displacement of the camera pairs offers differing viewpoints to reduce depth distortion effects. Further, compensating horizontal image shift values across both pairs of cameras determines where an overall zero-parallax setting is located in a scene, and therefore serves to balance the out-of-screen and into-screen depth effects entirely.

According to example embodiments, a user may adjust inter-axial distance, multi-rig spacing, and horizontal image shift throughout the image synthesis process. The user would also be allowed to fine-tune all three of these parallax parameters for optimal stereoscopic depth effects.

Using enhanced combinations of the horizontal shift adjustments described above, an enhanced 3D stereographic rendering may be produced by the virtual camera rigs adjusted at block 804 of method 800.

Thereafter, a minor sequence or short sequence of 3D animation may be rendered to re-confirm a desired 3D effect. For example, a short sequence including character motion, background motion, camera-panning, and/or other manipulation of portions of a virtual movie set and cameras may be produced. Thereafter, the short sequence may be viewed and/or confirmed.

Figure 10:
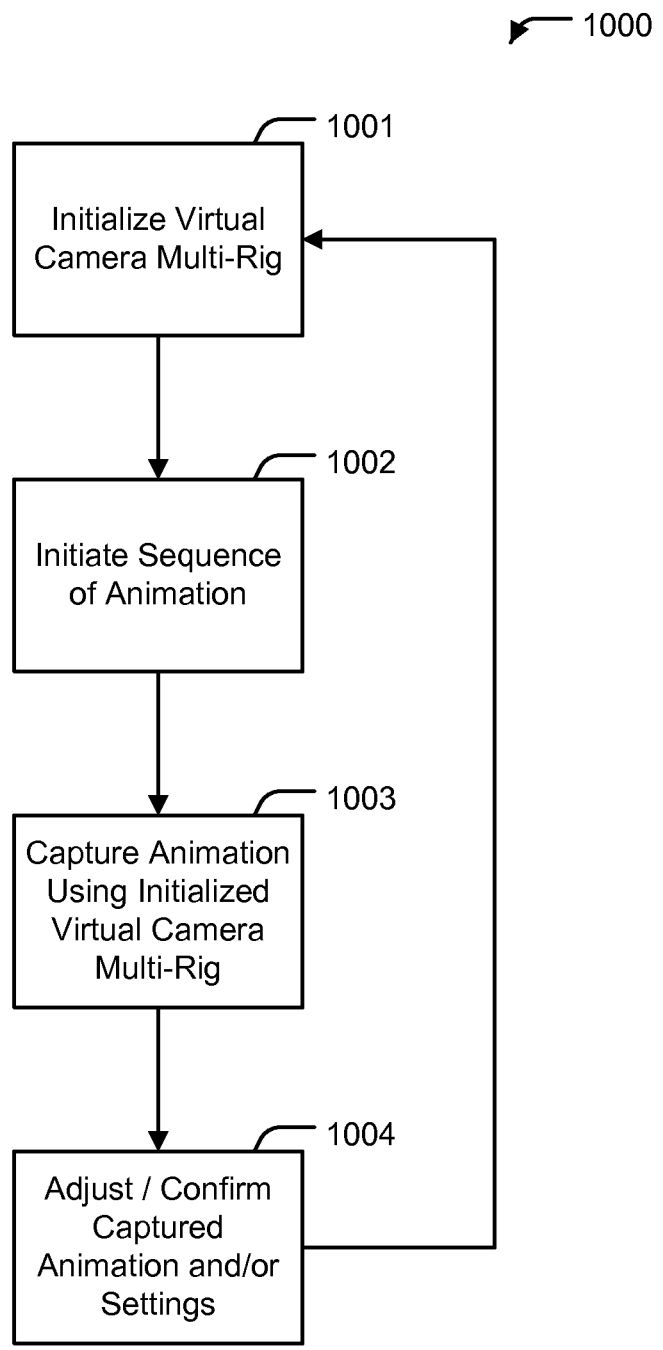
FIG. 10 depicts a method for 3D animation, according to example embodiments.

For example, as illustrated in FIG. 10, a method 1000 for producing 3D animation includes initializing a confirmed or previously adjusted virtual camera multi-rig at block 1001. Thereafter, a sequence of animation may be initiated at block 1002 and captured using the initialized virtual camera multi-rig at block 1003. The initiating and capturing may include rendering a plurality of computer animation frames based on a desired or predetermined frame rate, the animation frames comprised of a desired number of pixels or being of a desired resolution. The initiating and capturing may further include recording, through the virtual camera rig, the animation in a similar fashion as to real-life recording. Further, pre-processing, post-processing, editing, deleting, audio-integration, or any other suitable and/or necessary actions for producing a plurality of computer animation frames may be performed at block 1004.

Upon adjusting/confirming the captured animation, the method 10 may repeat as necessary to re-adjust settings and re-capture a desired 3D animation using the plurality of newly available adjustments of the virtual camera multi-rig.

Thereafter, animation curves may be produced, and a final sequence or portion of a 3D animation may be produced. The animation curves may be set up through confirmation of a plurality of scene settings. The scene settings being logical representations of a physical set including elements rendered by the computer apparatus. For example, there may be a scene layout, scene background, characters, and animation of each, including any other suitable elements. Each of these settings may be checked/confirmed through short sequences as described above, or through real-time manipulation of the virtual stereo-camera pairs described above. For example, the computer software may be configured to allow a user to control the panning/motion of each stereo-camera pair in relation to the scene, while at substantially the same time allowing for adjustment of any desired settings. Upon confirmation, the final sequence or portion of the animation may be rendered, approved, and stored/edited.

This final sequence/animation may be stored in the stereo storage folder described above, or in another storage portion such that final approval, interim approval, or disapproval may be decided. If approved, the sequence may be stored for later editing and/or inclusion in a complete 3D animation. If interim/temporary approval is decided, the sequence may be stored and/or edited while other portions/sequences of a complete 3D animation are produced. If not approved, the entire sequence may be reproduced using different settings.

Although termed "final" sequence or animation, it should be understood that the sequence may be further adjusted or edited using computer software/modeling to achieve a desired 3D effect.

Figure 11:
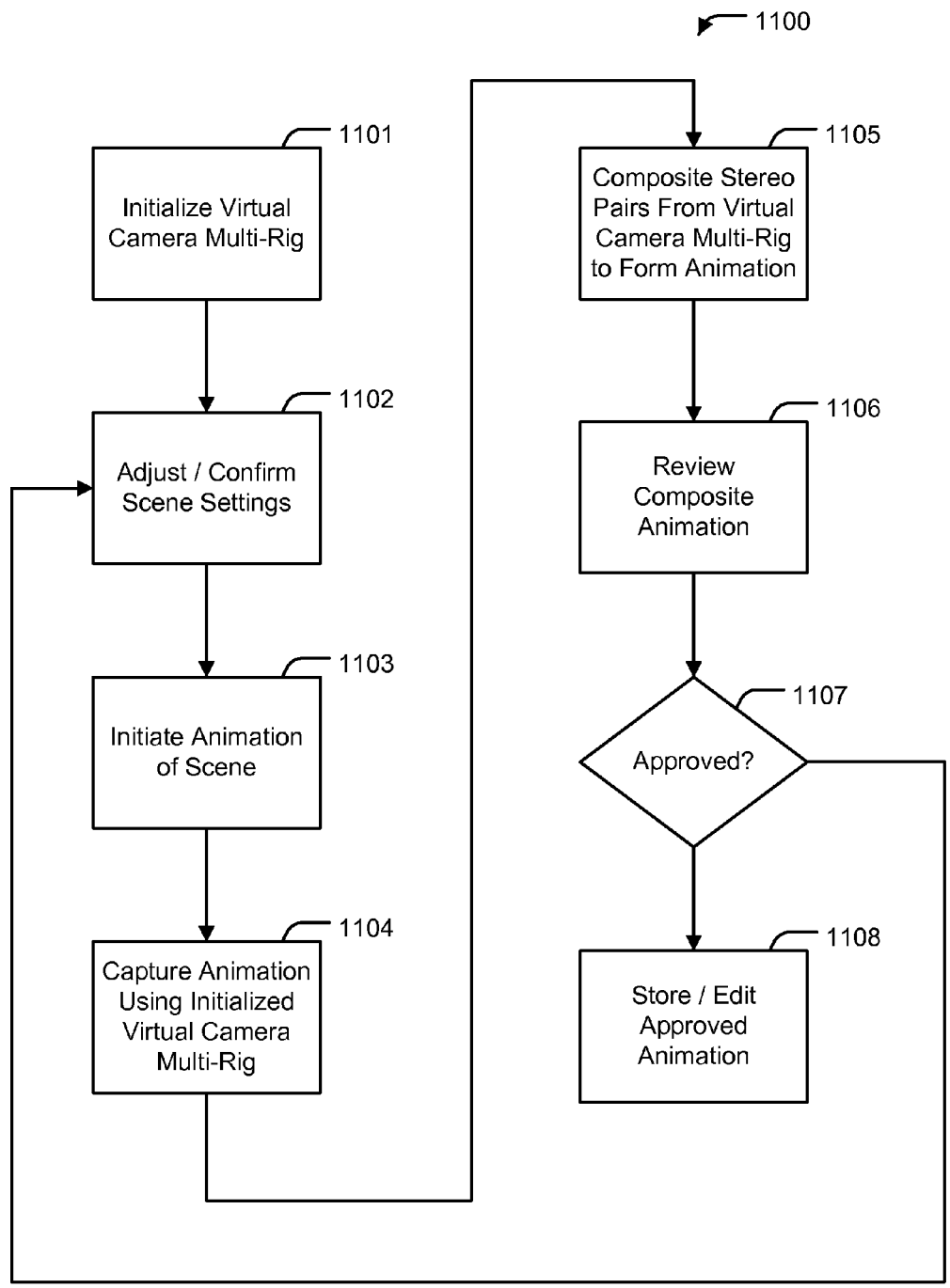
FIG. 11 depicts a method for 3D animation, according to example embodiments.

For example, FIG. 11 depicts a method for 3D animation including initializing a virtual camera multi-rig at block 1101. Thereafter, scene settings for a desired scene of a 3D animation may be adjusted/confirmed at block 1102. Animation may be initiated at block 1103 and captured using the initialized virtual camera multi-rig at block 1104. Upon capturing, related stereo pairs of frames may be composited together to form single stereo pairs with reduced depth distortions due to varying depths of foreground and background characters, scenery, etc at block 1105.

The composited animation may be reviewed at block 1106 and submitted to an approval process at block 1107. The approval process may include viewing of the composited 3D animation by a director or sterographic director of the 3D animation and approval, interim-approval, or final approval given as described above. The approved 3D animation may then be stored for further editing or distribution at block 1108. Furthermore, using information garnered through the approval process, additional settings may be adjusted and the method 1100 may repeat at block 1101 or 1102.

It should be appreciated that as a plurality of settings across multiple cameras may be adjusted, new artifacts and distortions may be introduced. However, example embodiments provide a method for 3D animation which significantly reduces these new artifacts.

Figure 12:
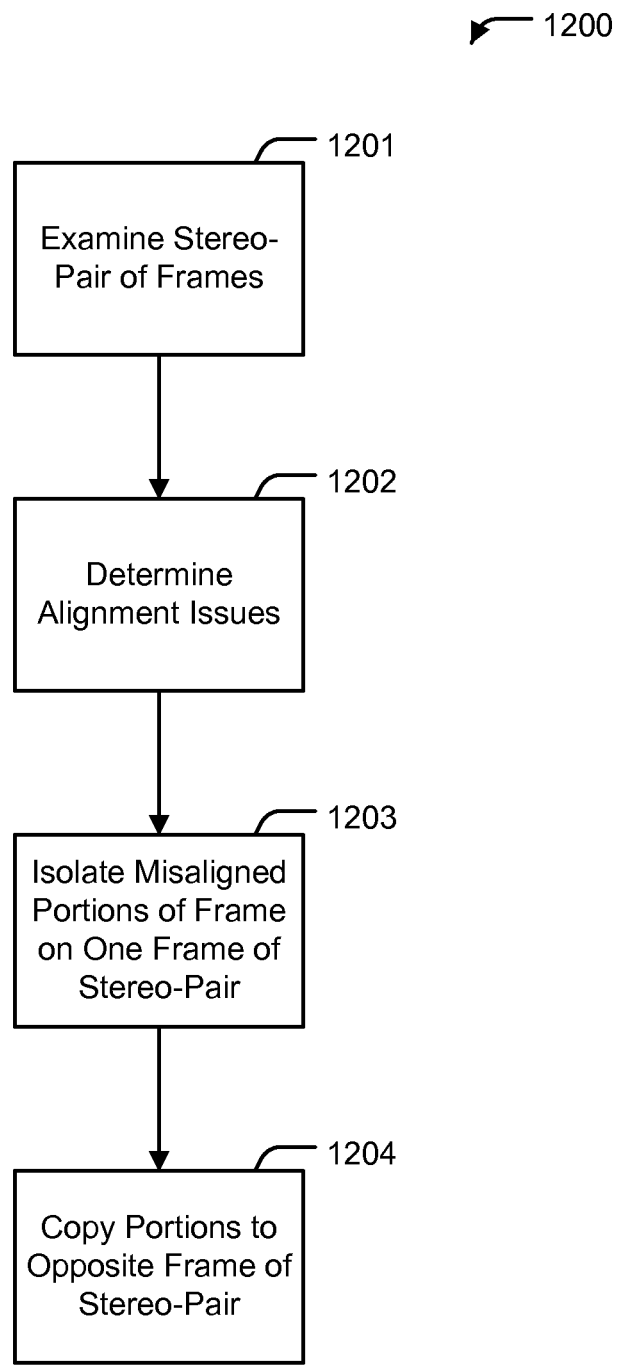
FIG. 12 depicts a system for 3D animation, according to example embodiments.

For example, although parallax and keystoning effects may be reduced, "silverfishing" or misaligned textures on 3D objects may become apparent through use of a virtual camera multi-rig. According to the method 1200 of FIG. 12, these misalignments may be corrected.

For example, the method 1200 includes examining a pair of stereo frames at block 1201. The method 1200 further includes determining alignment issues between the frames at block 1202. The determining may include locating misaligned textural features of objects in the examined frames.

Thereafter, the method 1200 includes isolating the misaligned portions on one frame of the pair of frames, for example, on the left or right frame. Thereafter, the isolated portions of the one frame are copied onto the opposite frame at block 1204. In this manner, the misaligned portions of texture are realigned resulting in a clear 3D effect absent "silverfishing."

Figure 13:
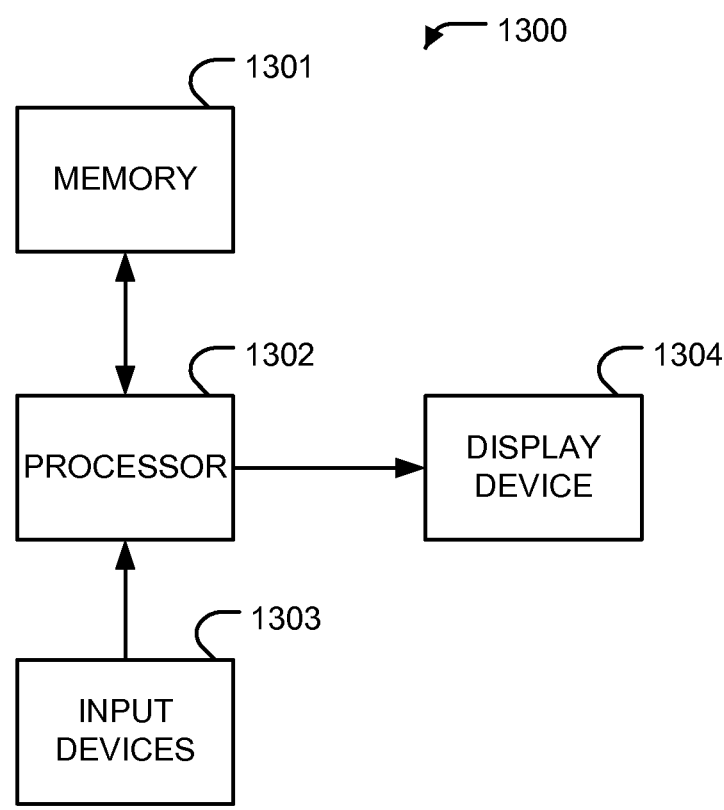
FIG. 13 depicts a computer apparatus, according to example embodiments.

Furthermore, according to an example embodiment, the methodologies described hereinbefore may be implemented by a computer system or apparatus. For example, FIG. 13 illustrates a computer apparatus, according to an exemplary embodiment. Therefore, portions or the entirety of the methodologies described herein may be executed as instructions in a processor 1302 of the computer system 1300. The computer system 1300 includes memory 1301 for storage of instructions and information, input device(s) 1303 for computer communication, and display device(s) 1304. Thus, the present invention may be implemented, in software, for example, as any suitable computer program on a computer system somewhat similar to computer system 1300. For example, a program in accordance with the present invention may be a computer program product causing a computer to execute the example methods described herein.

Figure 14:
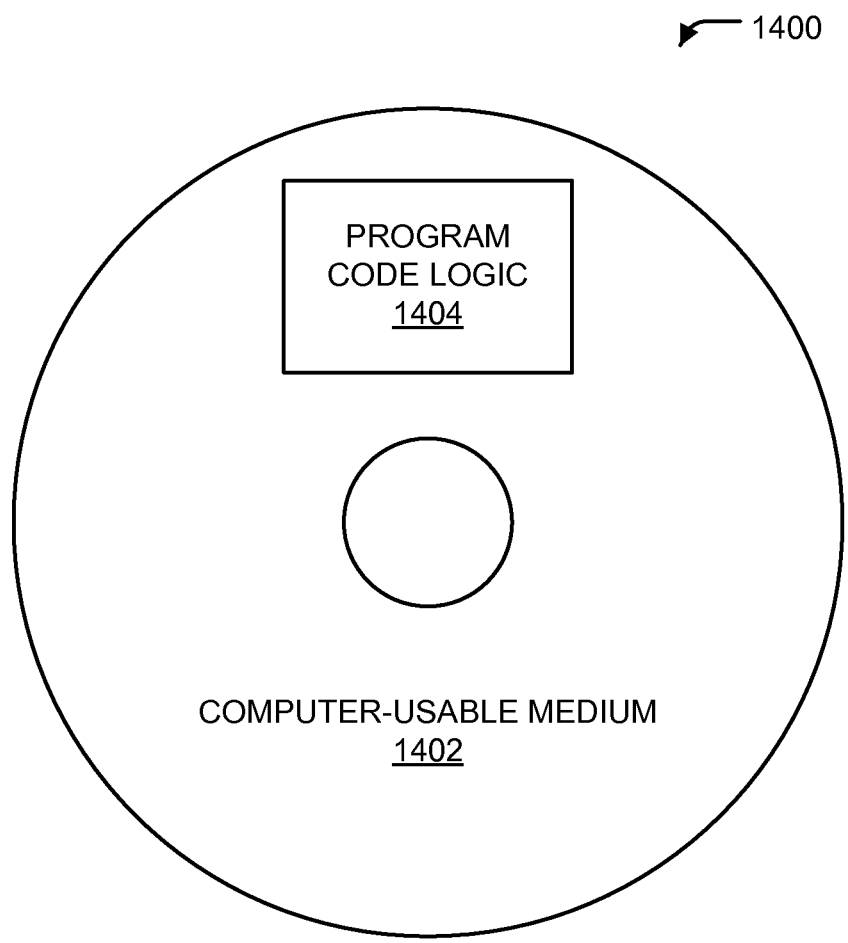
FIG. 14 depicts a computer program product, according to example embodiments.

Thus, example embodiments may include a computer program product 1400 as depicted in FIG. 14 on a computer usable medium 1402 with computer program code logic 1404 containing instructions embodied in tangible media as an article of manufacture. Exemplary articles of manufacture for computer usable medium 1402 may include floppy diskettes, CD-ROMs, hard drives, universal serial bus (USB) flash drives, or any other computer-readable storage medium, wherein, when the computer program code logic 1404 is loaded into and executed by a computer, the computer becomes an apparatus for practicing the invention. Embodiments include computer program code logic 1404, for example, whether stored in a storage medium, loaded into and/or executed by a computer, or transmitted over some transmission medium, such as over electrical wiring or cabling, through fiber optics, or via electromagnetic radiation, wherein, when the computer program code logic 1404 is loaded into and executed by a computer, the computer becomes an apparatus for practicing the invention. When implemented on a general-purpose microprocessor (e.g., 1302), the computer program code logic 1404 segments configure the microprocessor to create specific logic circuits.

The computer-readable storage medium may be a built-in medium installed inside a computer main body or removable medium arranged so that it can be separated from the computer main body.

Further, such programs, when recorded on computer-readable storage media, may be readily stored and distributed. The storage medium, as it is read by a computer, may enable the method(s) disclosed herein, in accordance with an exemplary embodiment of the present invention.

Therefore, the methodologies and systems of example embodiments of the present invention can be implemented in hardware, software, firmware, or a combination thereof. Embodiments may be implemented in software or firmware that is stored in a memory and that is executed by a suitable instruction execution system. These systems may include any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of at least one example embodiment of the present invention in which functions may be executed out of order from that shown or discussed, including substantially concurrently or in reverse order, depending on the functionality involved, as would be understood by those reasonably skilled in the art of the present invention.

Any program which would implement functions or acts noted in the figures, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory. In addition, the scope of the present invention includes embodying the functionality of the preferred embodiments of the present invention in logic embodied in hardware or software-configured mediums.

It should be emphasized that the above-described embodiments of the present invention, particularly, any detailed discussion of particular examples, are merely possible examples of implementations, and are set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system for three-dimensional (3D) animation, comprising:
   a means for storage;
   a computer apparatus in communication with the means for storage; and
   a means for display in communication with the computer apparatus; wherein,
   the means for storage is disposed to store data representing a 3D animation;
   the means for display is disposed to display a representation of the 3D animation; and
   the computer apparatus is configured to perform a method, comprising:
      setting a first inter-axial distance between logical representations of a first set of two cameras, the first inter-axial distance being configured to produce a desired 3D effect for a target audience;
      setting a second inter-axial distance between logical representations of a second set of two cameras;
      setting a multi-rig spacing between the first and second sets of two cameras, the multi-rig spacing being a value determined to reduce depth distortion effects in the 3D animation; and
      creating a stereoscopic frame set representing the 3D animation using the logical representations of the first and second sets of two cameras.

2. The system of claim 1, wherein creating the stereoscopic frame set comprises:
   creating a first 2D animation based on a first of the logical representations of the first set of two cameras, the first 2D animation including a first plurality of frames representing a first viewing angle;
   creating a second plurality of frames based on a second of the logical representations of the first set of two cameras representing a second viewing angle, the second plurality of frames being paired with the first plurality of frames to create a first stereoscopic frame set;

creating a second 2D animation based on a first of the logical representations of the second set of two cameras, the second 2D animation including a third plurality of frames representing a third viewing angle;

creating a fourth plurality of frames based on a second of the logical representations of the second set of two cameras representing a fourth viewing angle, the fourth plurality of frames being paired with the third plurality of frames to create a second stereoscopic frame set; and forming a final stereoscopic frame set representing the 3D animation through a composite of the first stereographic frame set and the second stereographic frame set.

3. The system of claim 1, wherein:

setting the first and second inter-axial distances comprises logically separating renderings captured by the logical representations of the two associated cameras for each set of two cameras by a distance the same as the first inter-axial distance; and setting the multi-rig spacing between the first and second sets of two cameras comprises logically separating renderings captured by the logical representations of the first and second sets of two cameras by a distance the same as the multi-rig spacing.

4. The system of claim 3, wherein the first inter-axial distance is based on an average ocular distance of the target audience and the multi-rig spacing is based on a depth of field between foreground and background portions of the 3D animation.

5. The system of claim 1, wherein the first inter-axial distance is based on an average ocular distance of the target audience and the multi-rig spacing is based on a depth of field between foreground and background portions of the 3D animation.

6. The system of claim 1, wherein the means for storage is disposed to store information related to the 3D animation.

7. The system of claim 6, wherein the information related to the 3D animation includes an inter-axial distance and multi-rig distance associated with the stereoscopic frame set.

8. The system of claim 1, wherein the means for display is a passive 3D display or an active 3D display.

9. The system of claim 8, wherein the means for display is a passive 3D display comprising:
an auto-stereoscopic display panel;
a lenticular screen panel; or
a polarized display panel.

10. The system of claim 8, wherein the means for display is an active 3D display comprising:
a LCD shuttering system.

11. The system of claim 1, further comprising storing information related to the 3D animation.

12. The method of claim 11, wherein the information related to the 3D animation includes an inter-axial distance and a multi-rig spacing associated with the stereoscopic frame set.

13. A system in accordance with claim 1, wherein said first and said second inter-axial distances are equal.

14. A method for 3D animation, comprising:

setting a first inter-axial distance between logical representations of a first set of two cameras, the first inter-axial distance being configured to produce a desired 3D effect for a target audience;

setting a second inter-axial distance between logical representations of a second set of two cameras;

setting a multi-rig spacing between the first and second sets of two cameras, the multi-rig spacing begin a value determined to reduce depth distortion effects in the 3D animation; and creating a stereoscopic frame set representing the 3D animation using the logical representations of the first and second sets of two cameras.

15. The method of claim 14, wherein creating the stereoscopic frame set comprises:

creating a first 2D animation based on a first of the logical representations of the first set of two cameras, the first 2D animation including a first plurality of frames representing a first viewing angle;

creating a second plurality of frames based on a second of the logical representations of the first set of two cameras representing a second viewing angle, the second plurality of frames being paired with the first plurality of frames to create a first stereoscopic frame set;

creating a second 2D animation based on a first of the logical representations of the second set of two cameras, the second 2D animation including a third plurality of frames representing a third viewing angle;

creating a fourth plurality of frames based on a second of the logical representations of the second set of two cameras representing a fourth viewing angle, the fourth plurality of frames being paired with the third plurality of frames to create a second stereoscopic frame set; and forming a final stereoscopic frame set representing the 3D animation through a composite of the first stereographic frame set and the second stereographic frame set.

16. The method of claim 14, wherein:

setting the first and second inter-axial distances comprises logically separating renderings captured by the logical representations of the two associated cameras for each set of two cameras by a distance the same as the first inter-axial distance; and setting the multi-rig spacing between the first and second sets of two cameras comprises logically separating renderings captured by the logical representations of the first and second sets of two cameras by a distance the same as the multi-rig spacing.

17. The method of claim 16, wherein the inter-axial distance is based on an average ocular distance of the target audience and the multi-rig spacing is based on a depth of field between foreground and background portions of the 3D animation.

18. The system of claim 14, wherein the inter-axial distance is based on an average ocular distance of the target audience and the multi-rig spacing is based on a depth of field between foreground and background portions of the 3D animation.

19. A method in accordance with claim 14, wherein said first and said second inter-axial distances are equal.

20. A computer program product for 3D animation, comprising a tangible non-transitory storage medium readable by a computer processor and storing instructions thereon that, when executed by the computer processor, direct the computer processor to perform a method, comprising:

setting an inter-axial distance between logical representations of a first set of two cameras at a computer system, the inter-axial distance being configured to produce a desired 3D effect for a target audience;

setting an inter-axial distance between logical representations of a second set of two cameras at a computer system;

setting a multi-rig spacing between the first and second sets of two cameras, the multi-rig spacing being a value determined to reduce depth distortion effects in the 3D animation; and creating a stereoscopic frame set representing the 3D animation using the logical representations of the first and second sets of two cameras.

21. The computer program product of claim 20, wherein creating the stereoscopic frame set comprises:

creating a first 2D animation based on a first of the logical representations of the first set of two cameras, the first 2D animation including a first plurality of frames representing a first viewing angle;

creating a second plurality of frames based on a second of the logical representations of the first set of two cameras representing a second viewing angle, the second plurality of frames being paired with the first plurality of frames to create a first stereoscopic frame set;

creating a second 2D animation based on a first of the logical representations of the second set of two cameras, the second 2D animation including a third plurality of frames representing a third viewing angle;

creating a fourth plurality of frames based on a second of the logical representations of the second set of two cameras representing a fourth viewing angle, the fourth plurality of frames being paired with the third plurality of frames to create a second stereoscopic frame set; and forming a final stereoscopic frame set representing the 3D animation through a composite of the first stereographic frame set and the second stereographic frame set.

22. The computer program product of claim 21, wherein the inter-axial distance is based on an average ocular distance of the target audience and the multi-rig spacing is based on a depth of field between foreground and background portions of the 3D animation.

* * * * *